United States Patent [19]

Smirl

[11] 3,951,393
[45] Apr. 20, 1976

[54] FULCRUMS FOR BELLEVILLE SPRINGS
[75] Inventor: Richard L. Smirl, Arlington Heights, Ill.
[73] Assignee: Borg-Warner Corporation, Chicago, Ill.
[22] Filed: July 22, 1974
[21] Appl. No.: 490,477

[52] U.S. Cl. .............................................. 267/161
[51] Int. Cl.² ......................................... F16F 1/34
[58] Field of Search .................... 267/161, 162, 159

[56] References Cited
UNITED STATES PATENTS

| | | | |
|---|---|---|---|
| 2,630,897 | 3/1953 | Porter | 267/161 |
| 3,237,739 | 1/1966 | Pritchard | 267/161 |
| 3,574,347 | 4/1971 | Hughes | 267/162 |

*Primary Examiner*—James B. Marbert
*Attorney, Agent, or Firm*—James A. Geppert

[57] ABSTRACT

An improved rate controlling fulcrum surface for use with a Belleville spring having a cone height of the unslotted spring portion of about 1.7 to about 2.3 times the spring thickness. The fulcrum has a convex surface on which one face of the spring moves as a load is applied to the spring. The fulcrum is ring shaped and has a relatively wide convex face, the movement of the face of said spring on said fulcrum acting to modify the inherent rate variation in the Belleville spring to provide a greatly extended range of a substantially constant spring load or maintain a substantially linear rate of spring deflection during use.

14 Claims, 6 Drawing Figures

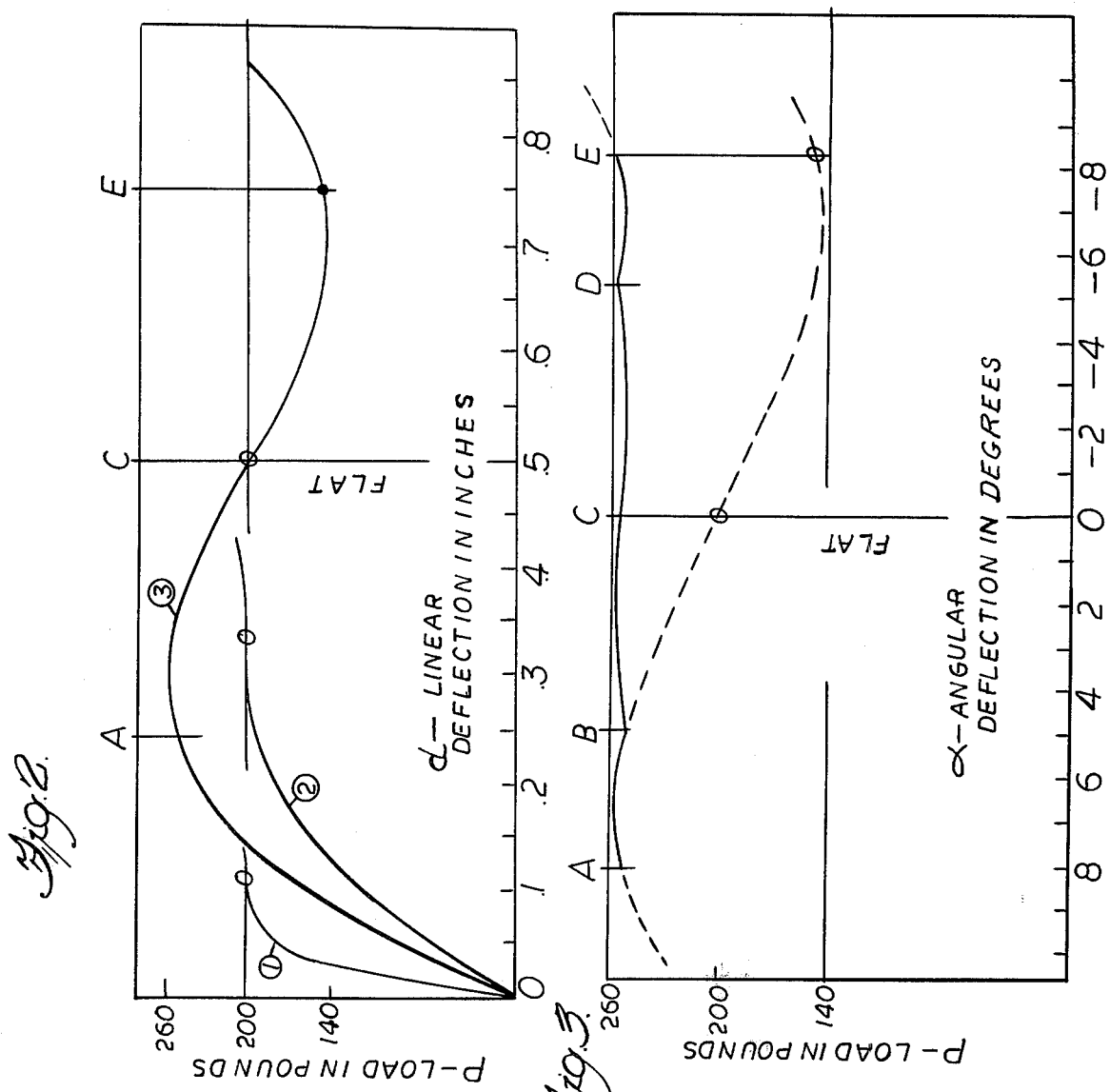
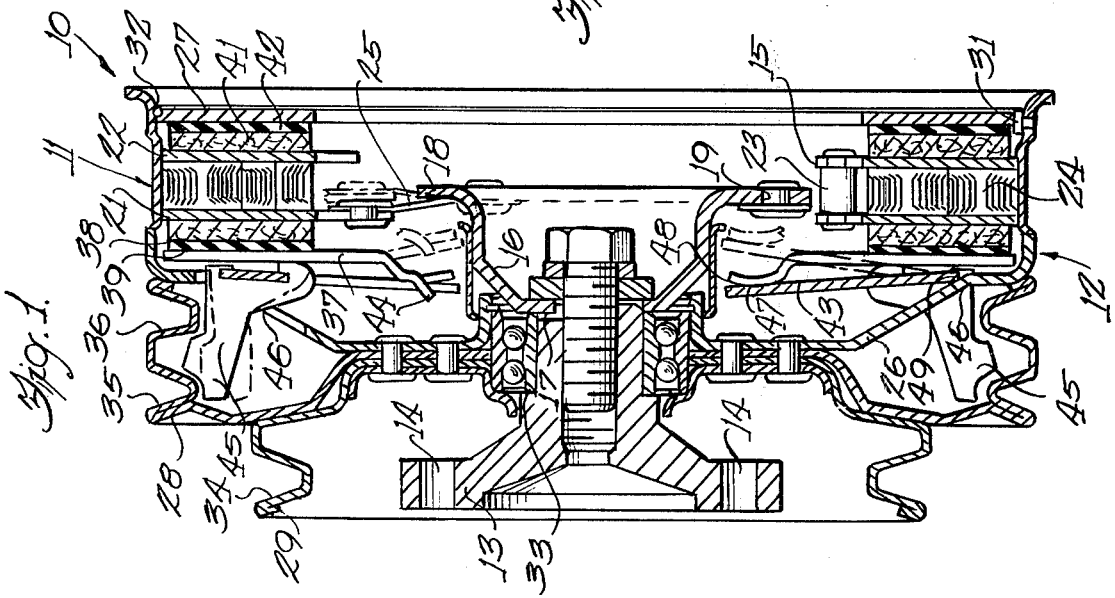

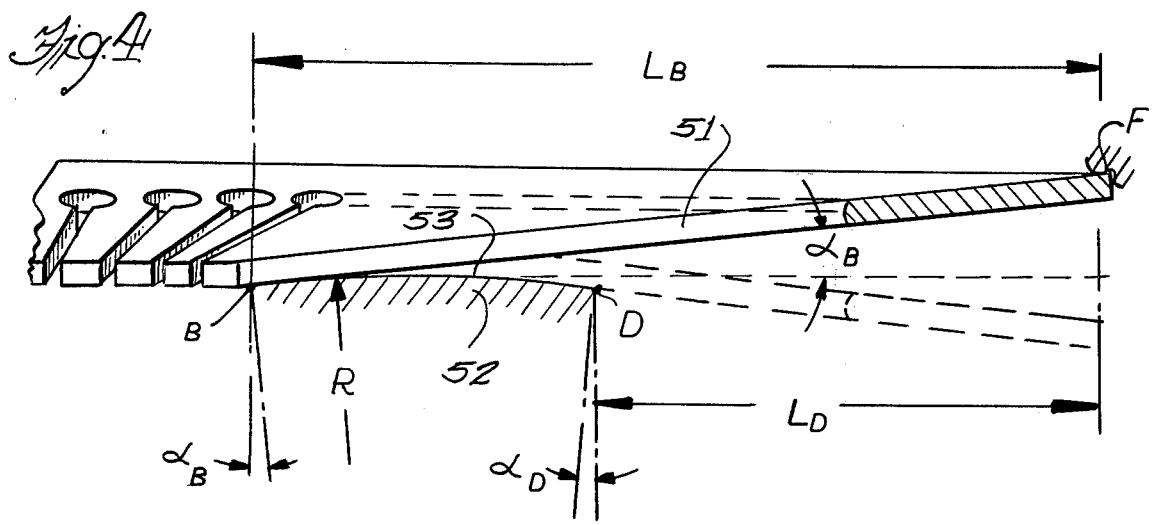
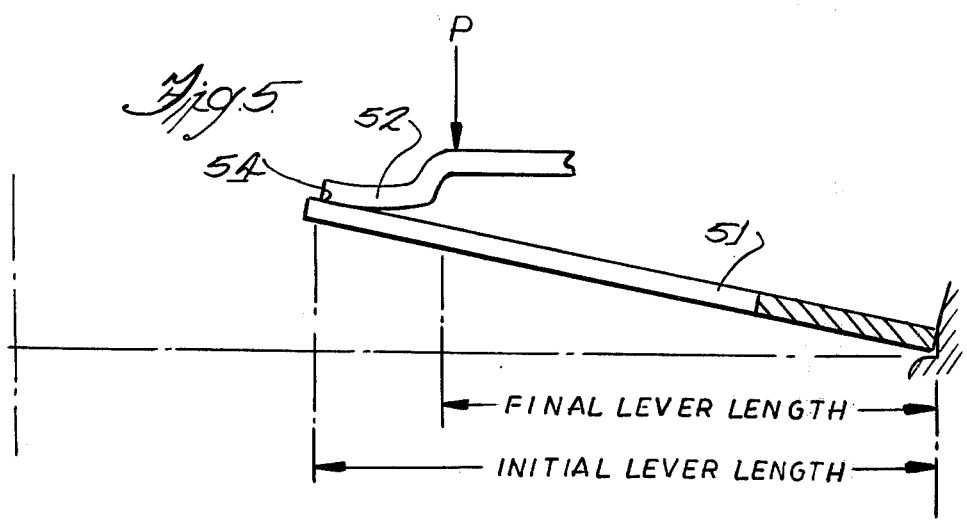
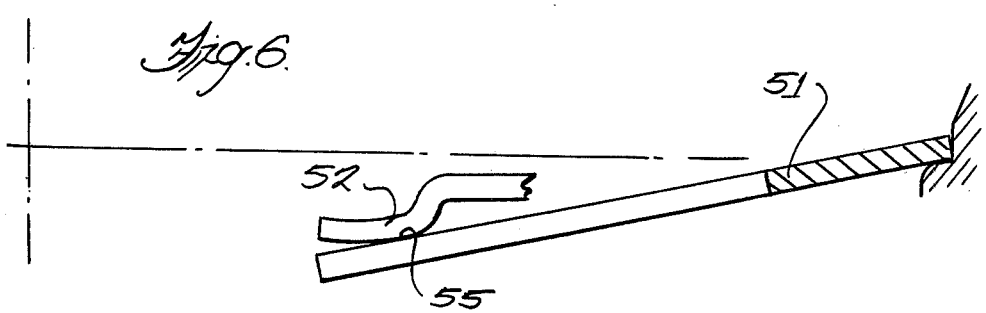

3,951,393

FULCRUMS FOR BELLEVILLE SPRINGS

BACKGROUND AND SUMMARY OF THE INVENTION

The present invention relates to a novel fulcrum cooperating with a generally conical spring of the Belleville type, and more particularly to a novel fulcrum contact surface for a Belleville spring.

Belleville springs have been in use generally for diaphragm spring clutch assemblies for automotive vehicles or similar devices wherein the spring is arranged in the assembly to effect a biasing force against a clutch pressure plate to frictionally engage a driven disc disposed between the pressure plate and an engine driven flywheel. Several design considerations are attendent to an acceptable and efficient spring for a clutch assembly, such as the stiffness of the spring to provide an adequate biasing force, the avoidance of the snap action tendency inherent in a dished diaphragm spring, and the rate variation inherent in the spring. The present invention aids in overcoming these various problems.

Among the objects of the present invention is the provision of a shaped fulcrum or load contact surface to cooperate with a Belleville type spring acting to compensate for the spring rate or load variation inherent in a Belleville spring and to greatly extend the range over which a substantially constant load or a substantially linear rate may be provided. A suitable application of a Belleville spring is shown in the recently issued Smirl U.S. Pat. No. 3,747,731 where it is desired to maintain a substantially constant load over an extended range of deflection for the spring. Other applications where these objectives are desirable include transmissions or other drive arrangements.

Another object of the present invention is the provision of a novel rate controlling fulcrum for a Belleville spring wherein the need for adjustments of the spring due to wear or tolerance stack-ups is minimized or substantially eliminated.

A further object of the present invention is the provision of a novel fulcrum for a Belleville type spring which will avoid the problems that might occur where the design of the spring itself is extended too close to its practical limits of deflection. Such problems could occur in the use of a Belleville spring in applications such as for the piston return springs of automatic transmissions.

Further objects are to provide a construction of maximum simplicity, efficiency, economy and ease of assembly and operation, and such further objects, advantages and capabilities as will later more fully appear and are inherently possessed thereby.

DESCRIPTION OF THE DRAWINGS

FIG. 1 is a vertical cross sectional view of a clutch assembly utilizing a Belleville spring and the novel fulcrum arrangement of the present invention.

FIG. 2 is a graph showing the load-deflection curves for three conventional Belleville springs.

FIG. 3 is a graph showing load verses angular deflection of the cone of the Belleville spring.

FIG. 4 is a partial cross sectional view of an embodiment of Belleville spring and the novel fulcrum.

FIGS. 5 and 6 are cross sectional views of the Belleville spring showing its contact with the fulcrum at the initial and final stages of deflection.

DESCRIPTION OF THE PREFERRED EMBODIMENT

Referring more particularly to the disclosure in the drawings wherein is shown an illustrative embodiment of the present invention, FIG. 1 discloses one form of clutch 10 incorporating the principles of the present invention, which clutch includes a driving member 11 and a driven member 12. A mounting flange 13 is adapted to be connected to a crank shaft of an internal combustion engine through bolt holes 14, and a rotor 15 forms part of the driving member 11 and includes a hub 16 having a radially inner portion 17 connected to the mounting flange 13 and a radially outer portion 18 provided with a pair of apertures 19. The rotor 15 comprises a pair of spaced apart plates 21 and 22 connected to each other by a plurality of spacers 23 disposed between the plates and connected to each to hold them apart under compressive loads and to transmit torque from one plate to the other. Also disposed between the plates is a convoluted fin member 24 adapted to promote air flow through the center of the rotor, thus providing for air cooling of the rotor and dissipation of heat.

A plurality of straps 25 connect the hub 16 with the plate 21; with the straps being formed of a relatively thin metal to permit axial deflection. The straps 25 are connected at one end to the radially outer portion 18 of the hub 16 and at their other end to the plate 21 of the rotor 15; thus connecting the rotor with the mounting flange 13 to form the driving member 11.

The driven member 12 consists of a housing 26 to which is affixed a reaction member 27 and torque transmitting means including a first pulley 28 and a second pulley 29. The reaction member 27 is constrained against relative rotation with respect to the housing 26 by means of a drive pin 31 secured to the housing 26 and adapted to engage a keyway in the reaction member 27. An annular wire retaining ring 32 engages half grooves in both the housing 26 and the reaction member 27 to prevent relative axial movement between these components in one direction. The pulleys and housing are interconnected and rotate as a single unit and are journalled for rotation on the mounting flange 13 by a bearing assembly 33. The pulleys 28 and 29 define V grooves 34, 35 and 36 adapted to carry drive belts to connect the driven member 12 with various accessories.

The driven member of the clutch includes a pressure applying member or pressure plate 37 carrying a friction element 38 formed of suitable individual pads or an annular ring of material. The friction element 38 is adapted to engage the plate 21, and disposed between the pressure plate 37 and the friction material 38 is a layer of cushioning material 39, preferably bonded to the plate 37. The material 39 acts to more uniformly distribute the load between the friction element 38 and the plate 21 and additionally, acts to dampen noise and vibration. A second friction element 41 is carried by the reaction member 27 and is adapted to engage the plate 22 of the rotor 15, and a layer of cushion material 42, similar to the layer 39, is disposed between the reaction member 27 and the friction element 41 for the same purpose.

Biasing means 43 in the form of a diaphragm spring of the Belleville type is carried by the housing 26 and is positioned between the housing and the pressure plate 37. The spring 43, upon assembly of the drive system, is placed in a compressed state such that it exerts a force against the pressure plate 37 to urge the friction element 38 into frictional engagement with the plate 21; the friction element 41 frictionally engaging the plate 22. Tabs 44 are formed on the pressure plate 37 to engage radial slots in the spring member 43.

Centrifugal weights 45 are shown attached to the spring 43, whith the weights extending laterally from the spring and being acted upon by centrifugal force upon rotation of the housing 26 and correspondingly the spring 43. The weights 45, when acted upon by centrifugal force, will tend to pivot outwardly about a point 46. In actual practice, no substantial movement or pivoting of the weights occurs, however, the centrifugal force acting on the weights produces a moment having a force component which acts to oppose and thereby decrease the engaging force of the spring as the speed of the driven member increases.

In the clutch as originally assembled prior to operation, the Belleville spring 43 is fully compressed beyond its flat position as shown by the solid lines of FIG. 1, with an inner fulcrum point 47 acting to engage a curved fulcrum surface 48 on pressure plate 37 and an outer fulcrum point 49 engaging the housing 26. Throughout the life of the clutch, the friction elements 38 and 41 will gradually wear resulting in a gradual movement of the weights 45, the Belleville spring 43, the pressure plate 37, the rotor 15 and the straps 25 to the positions indicated by the dotted lines in FIG. 1. The design of the fulcrum contacting surface of the present invention provides the advantage that a large range of constant spring load is provided regardless of pad wear throughout the life of the unit.

The selection of the type of Belleville spring most promising for an extended range, controlled rate use is an important step in the application of the present invention. To illustrate this step, FIG. 2 shows the load-deflection curves of three presently available Belleville springs, loaded adjacent their inner and outer peripheral edges on conventional fulcrum lands of moderate contact radius. Each spring has the same outside diameter of approximately 6 inches and is designed to have the same load when compressed to its flat position, indicated in FIG. 2 at the point where the curve intersects the line for 200 pounds load. Curve 1 is for a plain, unslotted spring formed to a moderate cone height (approximately 1.41 times the spring thickness) to provide a zero rate near its flat position.

Curve 2 is for a somewhat thicker spring that is slotted or scalloped and formed to a moderate cone height wherein the unslotted cone portion is approximately 1.41 times the spring thickness to provide a zero rate near its flat position. Both the springs of curves 1 and 2 provide some range of nearly constant load, but neither has the desired deflection range or energy capability.

Curve 3 represents a spring only slightly thicker and more deeply slotted than the spring of curve 2, but formed to a considerably greater cone height, resulting in a definite negative rate in its flat position and for a considerable distance on either side of it. The cone height of the unslotted portion of the spring, as shown in FIG. 4, is formed to 2.1 times the spring thickness, and the height is then reduced to about 2.05 times the thickness by stroking to point E on the curve to remove the set of the spring.

This spring 51, shown in enlarged partial section in FIG. 4, is selected to illustrate the application of a rate controlling fulcrum 52, but other cone heights of the unslotted portion of the cone of less than 2.5 times the spring thickness and preferably in the range of approximately 1.7 to 2.3 times the spring thickness will also function effectively. This selection covers a fully developed range of springs widely used in automotive clutches where a negative rate helps to reduce pedal effort. In such applications, the point E on curve 3 represents the fully released position of the clutch actuating pedal and point A on the curve represents the fully engaged position with worn facings.

In single plate automotive clutches, a large diameter Belleville spring can be accommodated, and the engaged position of the clutch can be limited to a range near the peak load, such as in the area between 0.25 and 0.40 deflection in FIG. 2. For the present intended applications, it is proposed to start with a smaller spring and utilize the entire deflection range between points A and E by compensating for the rate variation as subsequently described.

To simplify the steps necessary to determine the fulcrum shape, the useful portion between points A and E of curve 3 from FIG. 2 has been replotted in dotted lines in FIG. 3 showing the load versus angular deflection of the cone instead of linear deflection. A point B is selected on the load curve in FIG. 3 of about 4% below the maximum load and the corresponding cone angle $\alpha_B$ and load $P_B$ is noted. Considering FIGS. 4, 5 and 6, an enlarged layout is shown in FIG. 4 with the spring 51 deflected to the position of angle $\alpha_B$, and the inner fulcrum point B is located near the inner edge of the spring which replaces the conventional inner fulcrum for the deflection range of A to B of FIG. 3.

A point D is located on the load curve of FIG. 3 at the same angular deflection on one side of the flat or zero degree point as point B is on the opposite side of the flat. This point D will also be approximately 4% above the minimum load. The corresponding cone angle $\alpha_D$ and load $P_D$ is noted, and the fulcrum point D is located in the same plane as point B on FIG. 4, such that the distances $L_D$ and $L_B$ are proportional to the corresponding loads $P_D$ and $P_B$ on the dotted curve. In this instance, $L_D = L_B \times 150/250$ or $L_D = 0.6 L_B$. The dotted lines are added showing the spring deflected and in contact with point D (approximately 5° beyond the flat position of the spring). FIGS. 5 and 6 illustrate the positions of the spring at the ends of its rolling movement on the fulcrum contact surface at approximately the points B and D, respectively.

It should be noted that for the range of deflection between the points A and B, the spring 51 is pivoting about the edge 54 of the fulcrum 52, and similarly, for the range of deflection between the points D and E, the spring is pivoting about the edge 55 of the fulcrum. Thus, the rolling contact between the spring and the fulcrum surface 53 occurs only for the range of deflection between the points B and D.

Lines are then projected through points B and D normal to the cone surface of the spring, i.e., at angles $\alpha_B$ and $\alpha_D$ to the axis of the spring, and their point of intersection is located. In FIG. 4, this intersection point lies several inches below the bottom of the figure. Then, a radius R is drawn to connect points B and D using this intersection as its center. This arc 53 defines a section of the annular inner fulcrum surface to be used with a conventional outer fulcrum F to produce the substantially constant load curve ABCDE shown by the solid line in FIG. 3.

The fulcrum land formed in this manner as shown in FIG. 4 is a cross section of a relatively wide annular surface or ring for use in a clutch, such as shown in FIG. 1, or other application. The radial width of the land is a substantial fraction of the radial width of the Belleville spring, on the order of equal to or greater than 15% of the spring radial width. Also, the curved face of the land is a small segment, on the order of less than 5%, of the circumference of a circle having the radius R. The crown height of the arcuate segment forming the land surface is less than 1% of the radius R.

If desired, a conventional inner fulcrum may be used with an outer fulcrum similarly constructed to the arc 53 described above, or both fulcrums may be modified so long as the contact distances $L_B$ and $L_D$ are made proportional to the loads $P_B$ and $P_D$. The load curve ABCDE may be plotted point by point by drawing lines tangent to the fulcrum 52 of FIG. 4 at successive angular deflections $\alpha_X$ and measuring the radial distances $L_X$ from the contact point to the outer fulcrum F. The load $P_X$ at any angle of deflection $\alpha_X$ on the controlled rate curve can be obtained by multiplying the ratio $L_B/L_X$ times the load at the corresponding point on the uncontrolled rate curve. This step is not necessary where a load variation of about 5% from A to E is acceptable; the load curve being then represented by a straight line plus a deviation band.

If an application of a Belleville spring requires a completely flat load curve, the arc of radius R must be replaced by a segment of an ellipse with the major axis thereof normal to the axis of the spring. Thus, the contact surface for the fulcrum must have slightly less curvature near its mid-point, slightly more curvature near its end points, and points B and D on the dotted load curve must be located at the exact peak and valley of the curve. This fulcrum surface may be developed point-by-point by keeping $L_B/L_X = P_B/P_X$.

Also, a linear rate curve having a continuous negative rate or a continuous positive rate may be developed by introducing a constant of slightly less than one or slightly more than one in the above equation. For example, altering the equation to be $L_B/L_X = 0.95\, P_B/P_X$ will produce a slight negative rate.

Once determined, the fulcrum may be produced by stamping, as shown in the Smirl U.S. Pat. No. 3,747,731, or by die casting. For a small volume production, the surface may be machined by a form cutting tool.

I claim:

1. In combination with a Belleville spring having a variable spring rate providing a load deflection curve including a negative rate portion, a convex surfaced fulcrum in contact with one face of said spring, said face having a relative rolling movement on said fulcrum surface as a load is applied to said spring, said fulcrum being of an annular shape and having a relatively wide convex surface, said movement of the contact point of said spring on said fulcrum surface acting to modify the inherent load variation in the Belleville spring and provide an extended range of substantially constant spring load.

2. A Belleville spring combination as set forth in claim 1, in which the cone height of the unslotted portion of the spring is less than 2.5 times the thickness of the spring.

3. A Belleville spring combination as set forth in claim 1, in which the cone height of the unslotted portion of the spring is in the range of about 1.7 to about 2.3 times the thickness of the spring.

4. A Belleville spring combination as set forth in claim 1, in which said fulcrum has a surface comprising an annular ring having a radial width that is a substantial fraction of the radial width of the spring, and the arc defining the radial width of the surface represents a small segment of a circle.

5. A Belleville spring combination as set forth in claim 4, in which said radial width is greater than 15% of the radial width of the spring and said segment is less than 5% of the circumference of said circle.

6. A Belleville spring combination as set forth in claim 5, in which said arcuate segment has a crown height of less than 1% of its radius.

7. A Belleville spring combination as set forth in claim 1, wherein the fulcrum convex surface is utilized as one of the two fulcrum points positioned adjacent the inner and outer edges of the spring.

8. A Belleville spring combination as set forth in claim 7, in which the shape of the convex fulcrum surface is in the form of an arc of constant radius.

9. A Belleville spring combination as set forth in claim 7, in which the fulcrum surface has a wide annular contact shape which is crowned to progressively change the radial distance between the contact points of the spring with the inner and outer fulcrums proportionately with the change in load of the Belleville spring when measured on conventional fulcrums located near the edges of the spring.

10. A Belleville spring combination as set forth in claim 1, in which the spring has a pair of fulcrums adjacent the inner and outer edges thereof and a portion of the fulcrum convex surface is located on each of the two fulcrums.

11. A Belleville spring combination as set forth in claim 1, in which the shape of the said convex surface is in the form of a segment of an ellipse with the major axis thereof normal to the axis of the spring, so that the spring load curve is completely flat.

12. A Belleville spring combination as set forth in claim 9, in which the convex surface for the fulcrum is developed from the projection of a pair of lines through the maximum and minimum points defining the radial width of the surface and normal to the spring when these points provide the effective fulcrums under deflection, the intersection of the projected lines providing the center for a radius generating an arc connecting said points.

13. In combination with a Belleville spring having a variable spring rate providing a load deflection curve including a negative rate portion, a convex surfaced fulcrum in contact with one face of said spring, said face having a relative rolling movement on said fulcrum surface as a load is applied to said spring, said fulcrum being of an annular shape and having a relatively wide convex surface, said movement of the contact point of said spring on said fulcrum surface acting to modify the inherent load rate variation in the Belleville spring and provide an extended range of substantially linear negative deflection rate.

14. In combination with a Belleville spring having a variable spring rate providing a load deflection curve including a negative rate portion, a convex surfaced fulcrum in contact with one face of said spring, said face having a relative rolling movement on said fulcrum surface as a load is applied to said spring, said fulcrum being of an annular shape and having a relatively wide convex surface, said movement of the contact point of said spring on said fulcrum surface acting to modify the inherent load rate variation in the Belleville spring and provide an extended range of substantially linear positive deflection rate.

* * * * *